United States Patent [19]

Okita et al.

[11] 4,191,679

[45] Mar. 4, 1980

[54] PHOTOGRAPHIC POLYESTER FILM SUPPORT

[75] Inventors: Tsutomu Okita; Masami Satou; Noburo Hibino, all of Fujinomiya; Kazunobu Katoh; Masatoshi Sugiyama, both of Minami-ashigara, all of Japan

[73] Assignee: Fuji Photo Film Co., Ltd., Minami-ashigara, Japan

[21] Appl. No.: 938,161

[22] Filed: Aug. 30, 1978

[30] Foreign Application Priority Data

Aug. 31, 1977 [JP] Japan ................................ 52/104400

[51] Int. Cl.[2] ........................... C08K 5/08; G03C 1/84

[52] U.S. Cl. ................................... 260/40 R; 430/521

[58] Field of Search .......................... 96/84; 260/40 R

[56] References Cited

U.S. PATENT DOCUMENTS

| | | | |
|---|---|---|---|
| 3,413,257 | 11/1968 | Bowman et al. | 260/40 R |
| 3,720,693 | 3/1973 | Peters | 260/40 R |
| 3,741,995 | 6/1973 | Pugin et al. | 260/40 R |
| 3,849,139 | 11/1974 | Hibino et al. | 260/40 R |
| 3,853,807 | 12/1974 | Hunter | 260/40 R |

*Primary Examiner*—Sandra M. Person

*Attorney, Agent, or Firm*—Sughrue, Rothwell, Mion, Zinn and Macpeak

[57] ABSTRACT

A photographic polyester film support which is dyed with (a) a dye having a main absorption peak in the wavelength range of about 530 to about 570 nm, (b) a dye having a main absorption peak in the wavelength range of about 640 to about 680 nm and (c) a dye having a main absorption peak in the wavelength range of about 420 to about 460 nm which is represented by the formula (I) below:

(I)

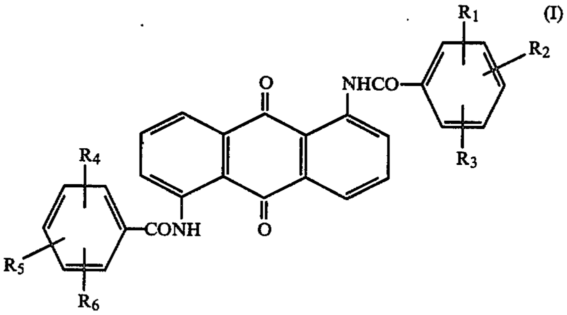

wherein $R_1$, $R_2$, $R_3$, $R_4$, $R_5$ and $R_6$, which may be the same or different, each represents —H, —OH, —$NH_2$, —$NHR_7$, —$NR_7R_8$, —Cl, —Br, an alkyl group having 4 or less carbon atoms or an alkoxy group having 4 or less carbon atoms; and $R_7$ and $R_8$, which may be the same or different, each represents an alkyl group having 4 or less carbon atoms or an aryl group.

13 Claims, No Drawings

PHOTOGRAPHIC POLYESTER FILM SUPPORT

BACKGROUND OF THE INVENTION

1. Field of the Invention

The present invention relates to a photographic film support and, more particularly, to a support for photographic films which has been treated so as to prevent halation and light piping (edge fog).

2. Description of the Prior Art

In general, supports for motion picture or recording films should be treated so that halation and light piping does not occur. If such are not prevented, disadvantages occur. For example, when one frame is exposed to light with a camera, (1) incident light scatters in the support or at the interface between the support and a subbing layer to cause formation of dim images due to the undesired exposure of the emulsion in that frame; and (2) incident light which passes through the support reaches another exposed or unexposed frame and the emulsion of the frame is fogged.

In the past, photographic supports have been dyed to prevent halation and light piping.

For instance, as disclosed in Japanese patent application (OPI) Nos. 14245/72 and 5425/73 (The term "OPI" as used herein refers to a "published unexamined Japanese patent application"), U.S. Pat. Nos. 2,622,026, 3,728,124 and 3,822,132, etc., it is known to dye a photographic film support with red and green dyes. Further, as disclosed in U.S. Pat. No. 3,340,062, a support for a photographic film in which finely divided powders of pigments such as a carbon black, titanium oxide, etc., is also known.

In general, light which causes halation and light piping is visible light, such as sunlight, etc. For this reason, it would appear that, if a support for a photographic film were dyed so as to have an absorption over the entire spectral wavelength range of visible light, halation and light piping could be prevented. Thus, supports for photographic films dyed to have a uniform absorption in the entire visible light wavelength range of about 400 to 700 nm are described in U.S. Pat. No. 2,622,026, column 1, lines 16 to 20.

Where a support for a photographic film is dyed with a dye mixture of a red dye (which has a main absorption peak in the wavelength range of 500 to 600 nm) and a green dye (which has main absorption peaks in the wavelength range of 400 to 500 nm and of 600 to 700 nm, respectively) to thereby prevent halation or light piping, there is the disadvantage that sufficient halation preventing effect or light piping preventing effect is not obtained or the apparent sensitivity of the photographic emulsion is decreased. Green dyes have main absorption peaks in the wavelength ranges of 400 and 500 nm and 600 and 700 nm. The main absorption peaks in these two wavelengths ranges result in an optical density which is generally not the same, namely, the main absorption peak in one range results in an optical density which is higher than the optical density resulting from the main absorption peak in the other range. For this reasin, green dyes do not possess the same optical densities in the wavelength range of from 400 to 500 nm and in the wavelength range of from 600 to 700 nm. Therefore, sufficient prevention of halation or prevention of light piping is not obtained in the wavelength range having the smaller optical density. In addition, although sufficient prevention of halation or prevention of light piping can be achieved by increasing the concentration of the green dye, if the concentration of the green dye is increased, a disadvantage that the incident light at the wavelength range having a larger optical density is absorbed in the support to cause a reduction in the apparent sensitivity of the emulsion which is sensitive to this wavelength range occurs.

In addition, the method for incorporating pigments such as finely divided titanium oxide, carbon black, etc., involves the disadvantage that uniform dispersion of these pigments in the support polymer is difficult to achieve and, furthermore, an increase in the haze degree (haze of a support) as a support for a photographic film occurs, thus, clear images are not obtained.

By using three kinds of dyes comprising a yellow dye, a red dye and a blue dye and by suitably selecting the dye mixing ratio, a support for a photographic film in which the optical densities of each of the main absorption peaks in the wavelength regions of 400 to 500 nm, 500 to 600 nm and 600 to 700 nm is the same can be obtained and, as a result, the decrease in sensitivity of the photographic light-sensitive material is minimized and sufficient prevention of halation and prevention of light piping is obtained. In addition, by changing the mixing ratio of the three dyes, it is possible to correct the color balance even in a color emulsion having poor color balance.

Dyes for dyeing polyester films for use as a support for photographic films must be simultaneously heat resistant, compatible and sublimation resistant, must be inert to silver halide emulsions, and must not adversely affect the photographic properties such as sensitivity, gamma, fog, etc.

Red and blue dyes which meet these requirements are those as described in Japanese patent application (OPI) Nos. 14245/72 and 5425/73, Japanese patent publication Nos. 8734/72, 8735/72 and 33724/76, U.S. Pat. Nos. 3,728,124, 3,822,132, and 3,933,502, etc. However, few yellow dyes which meet the requirements described above are known, and it has been desired to develop yellow dyes which are heat resistant, compatible with polyesters and sublimation resistant, which are inert to silver halide emulsions and which do not adversely affect the photographic properties such as sensitivity, gamma, fog, etc.

SUMMARY OF THE INVENTION

The present invention provides a photographic support, by using a specific yellow dye with a red dye and a blue dye in combination, which does not adversely affect the photographic properties and provides sufficient antihalation effect and light piping prevention effect.

An object of the present invention is to firstly provide a photographic polyester film support in which emulsion fog due to halation and light piping are prevented.

Secondly, an object of the present invention is to provide a polyester film support for color photography which does not cause any reduction in sensitivity and prevents blue fog.

Thirdly, an object of the present invention is to provide a polyester film support for photography dyed with dyes which have good heat resistance, are compatible with polyesters and have good sublimation resistance and which do not adversely influence the photographic properties of photographic products when such are used as photographic supports.

Fourthly, an object of the present invention is to provide a polyester support for black-and-white photography which has been treated so as to prevent halation and light piping.

Fifthly, an object of the present invention is to provide a support for color photography which enables correction of color balance.

This invention thus provides a photographic polyester film support dyed with (a) a dye having a main absorption peak in the wavelength range of about 530 to about 570 nm, (b) a dye having a main absorption peak in the wavelength range of about 640 to about 680 nm and (c) a dye having a main absorption peak in the wavelength range of about 420 to about 460 nm which is represented by the formula (I) below:

(I)

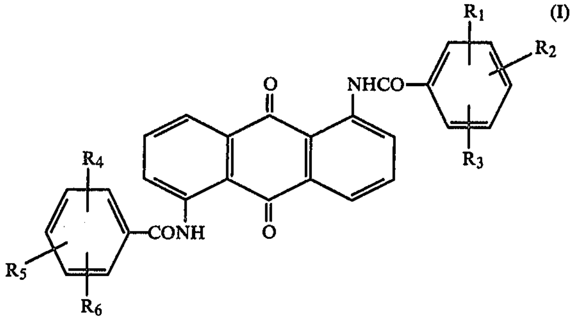

wherein $R_1$, $R_2$, $R_3$, $R_4$, $R_5$ and $R_6$, which may be the same or different, each represents —H, —OH, —$NH_2$, —$NHR_7$, —$NR_7R_8$, —Cl, —Br, an alkyl group having 4 or less carbon atoms or an alkoxy group having 4 or less carbon atoms; and $R_7$ and $R_8$, which may be the same or different, each represents an alkyl group having 4 or less carbon atoms or an aryl group.

DETAILED DESCRIPTION OF THE INVENTION

The dyes represented by the formula (I) above have the advantages that they have excellent sublimation resistance and heat resistance and give rise to a high optical density when they are used in a small amount, as compared to yellow dyes conventionally used as yellow dyes for photographic film supports.

The reason why the number of the carbon atoms in the alkyl group and in the alkoxy group is limited to 4 or less in the formula (I) is that, as compared to alkyl or alkoxy-substituted compounds where the number of carbon atoms in the alkyl group or alkoxy group is 4 or less, alkyl- or alkoxy-substituted compounds having at least 5 carbon atoms in the alkyl group or the alkoxy group have a lower optical density when the amount employed is the same. Suitable examples of preferred alkyl groups and alkoxy groups which can be used include methyl, ethyl, propyl, isopropyl, butyl, tert-butyl, methoxy, ethoxy, propoxy, isopropoxy, butoxy, and tert-butoxy groups. In order to obtain high optical density when a small amount is added, the total sum of the number of carbon atoms of $R_1$ to $R_6$ preferably is as small as possible and, more preferably, is 12 or less.

Specific examples of yellow dyes represented by the formula (I) include (1) 1,5-bis(Benzamido)anthraquinone
(2) 1,5-bis(o-Methylbenzamido)anthraquinone
(3) 1,5-bis(p-Methylbenzamido)anthraquinone
(4) 1-o-Aminobenzamido-5-p-ethylbenzamidoanthraquinone
(5) 1-(p-Hydroxybenzamido)anthraquinone
(6) 1-(p-Hydroxybenzamido)-5-benzamidoanthraquinone
(7) 1,5-bis(p-Methoxybenzamido)anthraquinone
(8) 1-o-Ethylbenzamidoanthraquinone
(9) 1-o-Chlorobenzamido-5-benzamidoanthraquinone
(10) 1,5-bis(2',4'-Dimethoxybenzamido)anthraquinone
(11) 1,5-bis(o-Methoxybenzamido)anthraquinone
(12) 1-(p-Methoxybenzamido)-5-(p-ethoxybenzamido)anthraquinone
(13) 1-Benzamido-5-(2',4'-diethylbenzamido)anthraquinone
(14) 1,5-bis(m-Methylbenzamido)anthraquinone
(15) 1,5-bis(p-Methoxybenzamido)anthraquinone
(16) 1,5-bis(o-Chlorobenzamido)anthraquinone
(17) 1,5-bis(m-Chlorobenzamido)anthraquinone
(18) 1,5-bis(p-Chlorobenzamido)anthraquinone
(19) 1,5-bis(o-Bromobenzamido)anthraquinone
(20) 1,5-bis(p-Bromobenzamido)anthraquinone
(21) 1,5-bis(p-Isopropylbenzamido)anthraquinone Particularly preferred dyes of the formula (I) are those represented by the formula (II).

(II)

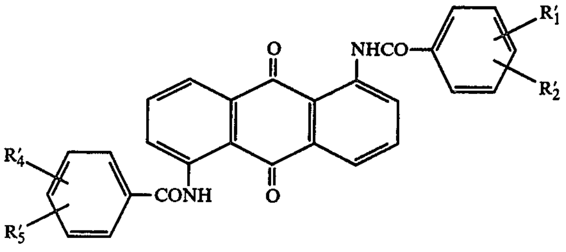

wherein $R'_1$, $R'_2$, $R'_4$ and $R'_5$, which may be the same or different, each represents —H, —OH, —$CH_3$, —$C_2H_5$, —$CH(CH_3)_2$, —$C(CH_3)_3$, —$OCH_3$, —$OC_2H_5$, —$OCH(CH_3)_2$ or —$OC(CH_3)_3$.

More preferred dyes are 1,5-bis(benzamido)anthraquinone, 1,5-bis(p-methylbenzamido)anthraquinone, 1,5-bis(o-methylbenzamido)anthraquinone, 1,5-bis(o-methoxybenzamido)anthraquinone, 1-(p-methoxybenzamido)-5-(p-ethoxybenzamido)anthraquinone, 1-benzamido-5-(2',4'-diethylbenzamido)anthraquinone, etc.

Since polyester films have a very stable physical structure, it is difficult to dye polyester films by dyeing them using a solvent. Therefore, a dope-dyeing method which comprises admixing a dye and dissolving such in a polyester during the synthesis of the polymer or during molding by melting the polyester and the dye with heat is preferred. Accordingly, coloring dyes must have high heat stability to withstand molding temperatures of about 270° to about 300° C. and must not discolor and fade due to decomposition. High heat resistance of the dyes is also necessary, because products formed by heat decomposition adversely influence the photographic properties. Further, this method has the advantage that the dyeing can be carried out simultaneously with molding and another step is not necessary.

In dope-dyeing, the coloring dyes must easily and uniformly disperse or dissolve in the polyester. Particularly, in photographic film support uses, since high transparency and no optical defects are essential, not the least bit of cloudiness can occur in the support due to insufficient dispersion of the coloring dyes or granular substances included in the support. As is well known, in polyesters, amorphous non-oriented films which are melt-molded should be stretched and heat treated at a suitable temperature so as to obtain advantageous properties. Accordingly, even if the dyes are uniformly dispersed in an amorphous nonoriented film and the apparent transparency is not harmed, cloudiness of the film very often increases, because air gaps are formed between the finely divided particles of the dyes, which do not undergo a plastic deformation, and the polyester matrix which is capable of undergoing a large plastic deformation in the next stretching step, with light being thereby scattered. Accordingly, in the production of, particularly, photographic film supports, sufficient precautions should be taken so that the dyes are dispersed as very small particles or dissolved as a molecular dispersion so that air gaps are not formed during the stretching.

On the other hand, since polyester films are usually molded using a tenter method, the film edges are inevitably not used. In order to reclaim these film edges, the film edges are collected and crushed and dried together with virgin polyester chips. Where the edges are dyed using dyes having poor sublimation resistance, the dyes sublime from the dyed waste edges during drying. Accordingly, not only are the dyes lost, but also the dryer is contaminated by the dyes which fall from the extrusion die to result in uneven dyeing. Further, where the polyester is dyed using dyes which easily sublime, when the polyester is extruded from an extrusion die onto a casting drum and cooled, the dyes sublime and contaminate the casting drum and uneven dyeing occurs in the dyed film. Therefore, it is important to dye using dyes which have good sublimation resistance.

Far higher heat resistance compatibility with polyester and sublimation resistance are required for dyeing photographic film supports as compared to dyeing of fibers.

Further, dyes for dyeing photographic film supports must be inert to the silver halide emulsions and must not adversely influence the photographic properties, such as sensitivity, gamma or fog, etc. Accordingly, only a very limited number of dyes can be used for dyeing photographic polyester bases.

Accordingly, whether dyes would be suitable for use in dyeing photographic polyester bases cannot be predicted from dyes which can be used for dyeing polyesters, in general.

For example, known yellow dyes which can be used for dyeing high molecular weight materials, such as polyesters, which are to some extent heat resistant, compatible with polyesters and sublimation resistant, include 1,5-dinitroanthraquinone, 1,5-anthraquinone disulfonic acid, 1-[o-(β-hydroxy ethylmercapto)benzamido]anthraquinone, 1,5-bis[p-(β-hydroxy ethoxy)-benzothio]anthraquinone and bis(β-hydroxyethyl)ester of 1,5-bis(o-carboxyphenylthio)anthraquinone. However, these known yellow dyes cannot be used for dyeing polyester photographic film supports because they all adversely influence the photographic properties. It can be seen from the above how difficult the selection of yellow dyes for photographic supports is.

Red dyes which can be employed in combination with the yellow dyes represented by the formula (I) in the present invention include anthraquinone dyes, triphenylmethane dyes, nitro dyes, nitroso dyes, stilbene dyes, indigoid dyes and thiazine dyes. Preferred red dyes are those having the following formula (III):

(III)

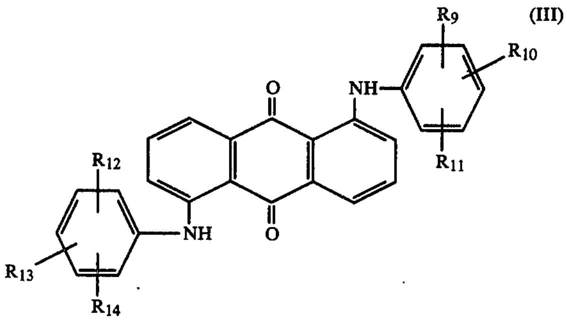

wherein $R_9$, $R_{10}$, $R_{11}$, $R_{12}$, $R_{13}$ and $R_{14}$ each represents —H, —OH, —$NH_2$, —$NHR_{15}$, —$NR_{15}R_{16}$, —Cl, —Br or an alkyl group having 4 or less carbon atoms or an alkoxy group having 4 or less carbon atoms; and $R_{15}$ and $R_{16}$ each has the same meaning as $R_7$ and $R_8$ in the general formula (I).

Suitable blue dyes which can be employed include, for example, anthraquinone dyes, triphenylmethane dyes, nitro dyes, nitroso dyes, stilbene dyes, indigoid dyes and thiazine dyes. Preferred blue dyes are those dyes having the following formula (IV):

(IV)

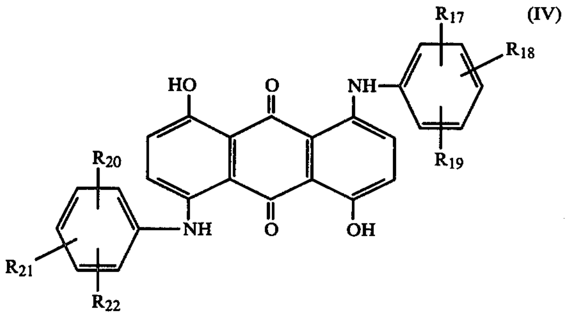

wherein $R_{17}$, $R_{18}$, $R_{19}$, $R_{20}$, $R_{21}$ and $R_{22}$, which may be the same or different, each represents —H, —OH, —$NH_2$, —$NHR_{23}$, —$NR_{23}R_{24}$, —Cl, —Br, an alkyl group having 4 or less carbon atoms or an alkoxy group having 4 or less carbon atoms; and $R_{23}$ and $R_{24}$ each has the same meaning as in the general formula (I).

In particular, where a yellow dye of the formula (I) is employed in combination with a red dye represented by the formula (III) and a blue dye represented by the formula (IV), the granularity of the mixed dyes is excellent. This is believed to be due to a marked difference in solubility in a solvent of the yellow dye of the formula (I), the red dye of the formula (III), and the blue dye of the formula (IV).

Particularly, where 1,5-bisbenzamidoanthraquinone is used as a yellow dye, 1,5-bis(p-anisidino)anthraquinone, 1,5-bis(p-toluidino)anthraquinone and 1,5-bis(m-toluidino)-anthraquinone is used as a red dye, and 1,5-bis(o-toluidino)-4,8-dihydroxyanthraquinone, 1,5-bis(p-anisidino)-4,8-dihydroxyanthraquinone and 1,5-bis(p-toluidino)-4,8-dihydroxyanthraquinone is used as the blue dye, the granularity was particularly good. The term "granularity" used herein has the following meaning. To prevent an uneven supply of a dye occurring upon dyeing, the dye is dissolved in a low boiling point solvent, such as methylene chloride, etc., and then the solvent is evaporated off to thereby coagulate the dye. Finely divided dye particles having a diameter of about 0.3 to 0.5 mm are obtained by classification and are supplied in a definite amount using a table feeder, etc. In this method, only a minor portion (i.e., 30 to 40%) of the particles thus-produced and then passed through a sieve has a diameter of about 0.3 to about 0.5 mm and in addition the particles are soft enough to be easily collapsed manually, where a dye having poor granularity is used, e.g., when 1,5-bis(p-anisidino)anthraquinone is used alone. To the contrary, with the combination of the three dyes described above, particles having a diameter of about 0.3 to 0.5 mm are obtained and 70% or more have an appropriate hardness. Less formation of powders using a table feeder occurs and uneven color on a support dyed with dyes is not observed. This difference is assumed to occur due to the fact that the red and blue dyes are dissolved in methylene chloride, whereas the yellow dye, or 1,5-bisbenzanthraquinone, is not dissolved but rather dispersed therein, and for this reason, acts as a nucleus for coagulation and the red and blue dyes are adsorbed on the 1,5-bisbenzanthraquinone so that an appropriate granularity and hardness are obtained.

The dyes are employed in a roll film in an amount such that the optical density of the spectral absorption of the respective main absorption peaks in the wavelength ranges of about 420 to about 460 nm, about 530 to about 570 nm and about 640 to about 680 nm is about 0.03 to about 0.15, more preferably, 0.04 to 0.10. With an optical density below about 0.03, a sufficient antihalation effect and sufficient prevention of light piping are not obtained. If the optical density exceeds about 0.15, the exposure amount is reduced and a reduction in the apparent sensitivity of the emulsion occurs. In addition, in film units for use in the diffusion transfer process, it is preferred for the optical density of the spectral absorption of the respective main absorption peaks at about 420 to about 460 nm, about 530 to about 570 nm and about 640 to about 680 nm to range from about 0.01 to 0.08, more preferably, 0.02 to 0.06. With an optical density less than about 0.01, sufficient prevention of light piping is not obtained and with an optical density greater than about 0.08, the images developed look grayish, which reduces their commercial value.

Suitable polyesters which can be used in the present invention are those which have been used generally for photographic supports. Specific examples of polyesters which can be used include polyethylene terephthalate, polyethylene naphthalate, polyethylene cyclohexyldicarboxylate, polybutylene terephthalate and polyethylene naphthalate, etc.

Methods of coloration which can be used include not only a method which comprises feeding the dyes just before film formation by melting both the polyester and the dyes but also a method which comprises adding dyes during production of the polymer.

Suitable methods of feeding the dyes include particularly a method which comprises continuously feeding with a table feeder after granulating and classifying the particles.

Photographic emulsions which can be coated on the photographic film supports thus-obtained include color positive photographic emulsions, color negative photographic emulsions, photographic emulsions for films for use in the diffusion transfer process, photographic emulsions for microfilms, black-and-white photographic emulsions, photographic emulsions for movie films and diffusion transfer photographic materials as described in, for example, U.S. Pat. Nos. 4,053,312, 3,443,943, 3,227,550, and 2,983,606, etc.

Since the support is dyed with the three yellow, red and blue dyes, the present invention is useful, particularly, with color photographic emulsions, because the apparent spectral sensitivity of the emulsion coated on the support can be adjusted by selecting the mixing ratio of the three yellow, red and blue dyes for dyeing the support and by selecting dyes each having a main absorption peak in a different wavelength range, even in a case of a color photographic emulsion having a poor color balance.

The present invention is described more specifically by reference to the following examples. Unless otherwise indicated, all parts, percents, ratios and the like are by weight.

EXAMPLE 1

1,5-bis(Benzamido)anthraquinone (λ max: 453 nm), 1,5-bis(anisidino)anthraquinone (λ max: 554 nm) and 1,5-bis(o-toluidino)-4,8-dihydroxyanthraquinone (λ max: 660 nm) were incorporated into polyethylene terephthalate in a ratio by weight of 1:3:2, in an amount of 0.02% by weight based on the weight of the polyethylene terephthalate. The polyethylene terephthalate mixture was melted and extruded from a slit die in the form of a sheet using an extruder, under a reduced pressure of 3 mm Hg. The sheet so extruded was cooled using a cooling roll and then the sheet was subjected to a stretching in the length direction between a pair of low speed rolls and a pair of high speed rolls; stretching in the width direction using a tenter; and heat setting in the tenter, to prepare a film of a thickness of 100 microns. The optical density of this film was 0.06 at 453 nm, 554 nm and 660 nm; and 0.04 at 490 nm and 610 nm.

An aqueous dispersion of a vinylidene chloride-methyl acrylate-hydroxyethyl acrylate copolymer (copolymerization weight ratio: 83:12:5; concentration: 2 wt%) was coated onto this film. Further, a blue-sensitive silver iodobromide emulsion (6 mol% of silver iodide) layer containing a yellow coupler emulsified dispersion, a green-sensitive silver iodide emulsion (6 mol% of silver iodide) layer containing a magenta coupler emulsified dispersion, a red-sensitive silver iodobromide emulsion (6 mol% of silver iodide) layer containing a cyan coupler emulsified dispersion, and a gelatin layer containing an ultraviolet absorbant were coated thereon to thereby prepare a color negative film. Each of the emulsions used therein were obtained by dissolving couplers in a solvent mixture of dibutyl phthalate and tricresyl phosphate and then dispersing the solution in a gelatin solution to obtain an O/W type emulsion, using sorbitan monolaurate and sodium dodecylbenzenesulfonate as dispersing agents.

α-(2,4-Dioxo-5,5'-dimethyloxazolidinyl)-α-pivaloyl-2-chloro-5-[α-(2,4-di-t-amylphenoxy)-butyramido]acetanilide, 1-(2,4,6-trichlorophenyl)-3-[(2-chloro-s-tetradecanamido)anilino]-2-pyrazoline-5-one and 2-[α-(2,4-di-t-amylphenoxy)butyramido]-4,6-dichloro-5-methylphenol were used as yellow, magenta and cyan couplers, respectively. Further, compound (a) of the formula indicated below

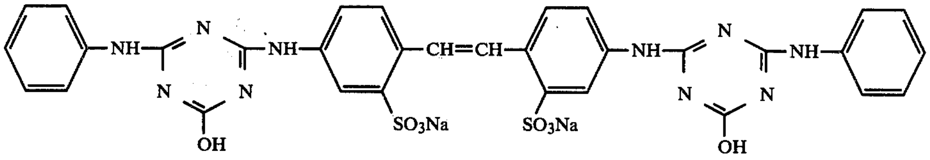

was used as the ultraviolet absorbant. 6-Methyl-4-hydroxy-1,3,3a,7-tetrazaindene was used as an antifogging agent in the emulsion.

The amounts of the couplers and silver halide coated in the negative film were as follows.

| | Amount of Coupler Coated | Amount of Silver Coated |
|---|---|---|
| | ($g/m^2$) | ($g/m^2$) |
| Red-Sensitive Layer | 0.4 | 0.5 |
| Green-Sensitive Layer | 0.5 | 0.6 |
| Blue-Sensitive Layer | 0.4 | 0.8 |

Test for Light Piping

One end of a sample of the thus-obtained color negative film was shielded from light and the other end of the film was exposed to sunlight of about 120,000 lux for 10 minutes. The color negative film was then processed in the following manner.

| Processing Steps | | |
|---|---|---|
| Color Development | 31° C. | 3 minutes and 30 seconds |
| Bleach Fixing | " | 1 minute and 30 seconds |
| Water Washing | " | 2 minutes |
| Stabilizing | " | 1 minute |

The processing solutions used had the following compositions.

| Color Developer | |
|---|---|
| Benzyl Alcohol | 14 ml |
| Sodium Sulfite | 2 g |
| Potassium Bromide | 0.5 g |
| Sodium Carbonate (monohydrate) | 30 g |
| 4-Amino-N-ethyl-N-(β-methanesulfonamido)-m-toluidine Sesquisulfate (monohydrate) | 4.5 g |
| Water to make | 1 l |

| Bleach Fixing Solution | |
|---|---|
| Ammonium Thiosulfate (70% aq. soln.) | 150 ml |
| Sodium Sulfite | 5 g |
| Na[Fe(EDTA)] | 40 g |
| EDTA | 4 g |
| Water to make | 1 l |
| (EDTA is ethylenediamine tetraacetic acid) | |

| Stabilizing Solution | |
|---|---|
| Glacial Acetic Acid | 10 ml |
| Sodium Acetate | 5 g |
| Formaldehyde (37% aq. soln.) | 5 ml |
| Water to make | 1 l |

Halation Evaluation

Another sample of the thus-obtained color negative film was exposed to light (500 CMS) using a sensitometer and then subjected to the same processing as in the light piping test.

Good images of a clear color tone were obtained without fog due to halation and light piping occurring. In addition, from the time of film-forming to development processing, no color fading of the dyes was observed and no adverse influence was observed in the film-forming step and in the development step.

EXAMPLE 2

A container rupturable under pressure and retaining a processing solution was adhered to one end of a light-sensitive sheet having coated thereon a color photographic emulsion. A cover sheet produced as described below was combined with the light-sensitive sheet so that Surface A of the cover sheet faced the light-sensitive sheet, and the light piping test was carried out.

The cover sheet was produced as described below.

1,5-bis-Benzamidoanthraquinone (λ max: 453 nm), 1,5-bis(p-toluidino)anthraquinone (λ max: 554 nm) and 1,5-bis-(o-toluidino)-4,8-dihydroxyanthraquinone (λ max: 660 nm) were incorporated into polyethylene terephthalate in a weight ratio of 3:2:2, in a total amount of 0.015 wt%. A base having a thickness of 100 microns was prepared in the same manner as described in Example 1.

The optical density of this film was 0.03 at 420 nm, 554 nm and 660 nm, and 0.02 at 485 nm and 610 nm.

Onto one surface (Surface A) of this film was coated Subbing Solution (1) having the following composition in an amount of 40 $ml/m^2$, followed by drying at 120° C. for 3 minutes.

| Subbing Solution (1) | |
|---|---|
| Aqueous Dispersion of Vinylidene Chloride-Methyl Acrylate-Hydroxyethyl Acrylate Copolymer (copolymerization ratio (weight ratio): 83:12:5; concentration: 50 wt%) | 4 g |
| Water to make | 100 ml |

Onto the thus-formed first subbing layer was further coated Subbing Solution (2) having the composition shown below in an amount of 40 $ml/m^2$, followed by drying at 100° C. for 2 minutes.

| Subbing Solution (2) | |
|---|---|
| Reaction Product of Polyamide (obtained from diethylene triamine and adipic acid) and Epichlorohydrin | 0.07 g |
| Gelatin | 1.0 g |
| Saponin | 0.01 g |
| Water to make | 100 ml |

Onto the other surface (Surface B) of this film were coated the following subbing layer and a curl-preventing and antistatic layer in this order.

| Subbing Lyaer (coated amount: 40 ml/m$^3$) | |
|---|---|
| Vinylidene Chloride-Methyl-Acrylate-Hydroxyethyl Acrylate (copolymerization ratio(weight ratio) 85:8:7; 50 wt% concentration, aqueous dispersion) | 3 g |
| Saponin | 0.001 g |
| Water to make | 100 ml |

| Curl-Preventing and Antistatic Layer (coated amount: 120 g/m$^2$) | |
|---|---|
| Cellulose Diacetate | 8 g |
| Acetone | 80 ml |
| Methanol | 20 ml |
| Poly-N-methacryloxyethyl-N,N,N-triethyl Ammonium Salt | 0.7 g |

The following layers were coated in order onto the thus-obtained Surface A. The coating was carried out by dip coating. The "g/m$^2$" shown below is the coated amounts of the solid components after drying.

Acid Polymer Layer

Polyacrylic Acid (22 g/m$^2$)
(degree of polymerization: about 10,000)

Neutralization Timing Layer

Cellulose Diacetate (5 g/m$^2$)
(degree of acetylation: 40%; degree of polymerization:
130–160)

The light-sensitive sheet was prepared in the following manner.

The following layers were coated in the order listed onto a transparent polyethylene terephthalate support having a thickness of 180 microns.

(1) A layer containing a mordant (3.0 g/m$^2$) of the following formula

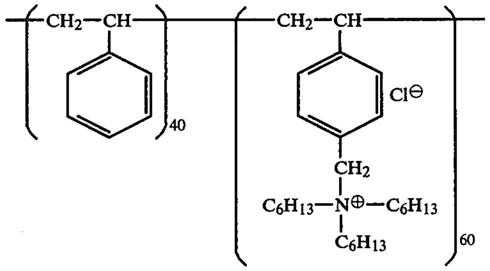

and gelatin (3.0 g/m$^2$)

(2) A layer containing titanium dioxide (20 g/m$^2$) and gelatin (2.0 g/m$^2$)

(3) A layer containing carbon black (2.5 g/m$^2$) and gelatin (2.5 g/m$^2$)

(4) A layer containing a cyan dye image providing material (0.50 g/m$^2$) of the following formula

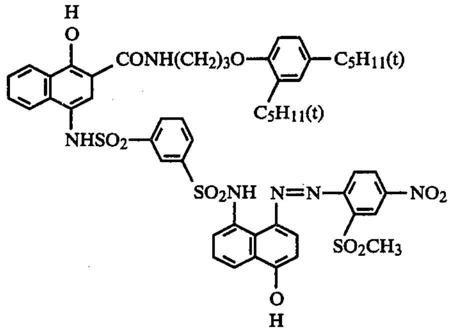

diethyllaurylamide (0.25 g/m$^2$) and gelatin (1.14 g/m$^2$)

(5) A layer containing a red-sensitive internal latent image type direct reversal emulsion (1.9 g/m$^2$ as silver; silver bromoiodide; gelatin: 1.4 g/m; I content: 6 mol%), a fogging agent represented by the following formula (0.028 g/m$^2$)

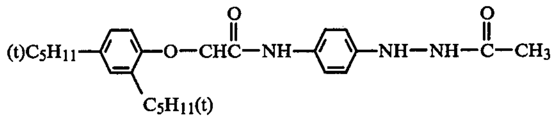

and sodium dodecylhydroquinone sulfonate (0.13 g/m$^2$)

(6) A layer containing gelatin (2.6 g/m$^2$) and 2,5-dioctylhydroquinone (1.0 g/m$^2$)

(7) A layer containing a magenta dye image providing material (0.45 g/m$^2$) of the following formula

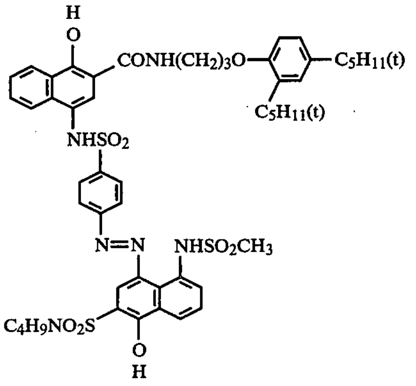

diethyllaurylamide (0.10 g/m$^2$), 2,5-di-t-butylhydroquinone (0.0074 g/m$^2$) and gelatin (0.76 g/m$^2$)

(8) A layer containing a green-sensitive internal latent image type direct reversal emulsion (silver iodobromide, 1.4 g/m$^2$ as silver; gelatin: 1.0 g/m$^2$; I content: 6 mol%), the same fogging agent as in Layer (5) (0.024 g/m$^2$) and sodium dodecylhydroquinone sulfonate (0.11 g/m$^2$)

(9) A layer containing gelatin (2.6 g/m$^2$) and 2,5-dioctylhydroquinone (1.0 g/m$^2$)

(10) A layer containing a yellow dye image providing material (0.78 g/m$^2$) of the formula

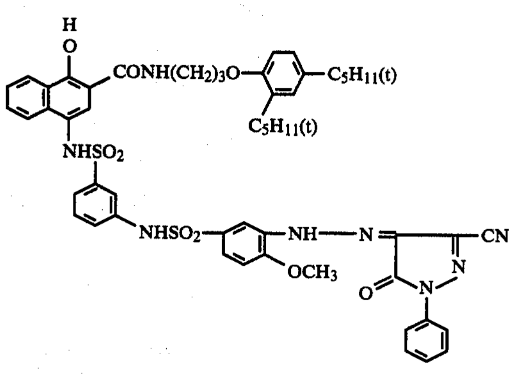

diethyllaurylamide (0.16 g/$m^2$), 2,5-di-t-butylhydroquinone (0.012 g/$m^2$) and gelatin (0.78 g/$m^2$)

(11) A layer containing a blue-sensitive internal latent image type direct reversal type emulsion (silver iodobromide, 2.2 g/$m^2$ as silver; gelatin: 1.7 g/$m^2$; I content: 6 mol%), the same fogging agent as in Layer (5) (0.020 g/$m^2$) and sodium dodecylhydroquinone sulfonate (0.094 g/$m^2$)

(12) A layer containing gelatin (0.94 g/$m^2$)

A processing solution having the following composition was charged into a container rupturable under pressure in an amount of 0.8 g.

| Processing Solution Composition | |
|---|---|
| 1-Phenyl-4-methyl-4-hydroxymthyl-pyrazolone | 10 g |
| Methylhydroquinone | 0.18 |
| 5-Methylbenzotriazole | 4.0 g |
| Sodium Sulfite (anhydrous) | 1.0 g |
| N Carboxymethyl Cellulose | 40.0 g |
| Carbon Black | 150 g |
| Potassium Hydroxide (28% aq. soln.) | 200 cc |
| Water | 550 cc |

Test for Light Piping

The cover sheet and the light-sensitive sheet were cut to a size of 10 cm×10 cm, and combined with the processing solution to prepare a film unit for use in the diffusion transfer process. A cassette for Kodak Instant Print Film PR-10 (trademark, Eastman Kodak Co., Ltd.) was loaded with one of the so-obtained film units. After exposure to sunlight of about 120,000 lux, an instant print film was instantly developed.

No fog due to halation or light piping was observed in the thus-obtained film and good images having a clear color tone were obtained. Further, no excessive coloration of the dyes from the film formation and to the development was observed and the film formation and development were not adversely affected.

COMPARISON EXAMPLE 1

A photographic film was produced in the same manner as described in Example 1 except that two dyes, 1,5-bis(p-anisidino)anthraquinone and 1,5-bis(o-toluidino)-4,8-dihydroxyanthraquinone in a mixing ratio of 3:2 (by weight), were added in an amount of 0.02% by weight based on the polyethylene terephthalate instead of the dyes for the polyethylene terephthalate used in Example 1. After the same light piping evaluation as described in Example 1 was carried out, the photographic film was subjected to development, fixing, water wash and stabilization processing in the same manner as described in Example 1. The resulting film had a marked degree of blue fog due to light piping and good images were not obtained.

COMPARISON EXAMPLE 2

A photographic film was produced in the same manner as described in Example 1 except that three dyes, 1,5-dinitroanthraquinone, 1,5-bis(p-anisidino)anthraquinone and 1,5-bis-(o-toluidino)-4,8-dihydroxyanthraquinone in a mixing ratio of 1:3:2 (by weight), were added in an amount of 0.02% by weight based on the polyethylene terephthalate instead of the dyes for the polyethylene terephthalate used in Example 1. Then, a light piping evaluation was carried out in the same manner as described in Example 1. After a light shielding part was exposed to light (500 CMS) using a sensitometer in the same manner as described in Example 1, the film was subjected to development, fixing, water wash and stabilization processing in the same manner as described in Example 1. Although fogging due to the light piping was not observed in the resulting film, the exposed areas became darkish as a whole and, consequently, distinct images were not obtained.

The following conclusions can be drawn from the results set forth in these Examples and Comparative Examples.

(1) If a dye having a main absorption peak in the wavelength region of from about 420 to about 460 nm is not present, light of a wavelength of 400 to 500 nm is not absorbed in the support and this results in fogging the emulsion which is sensitive to this wavelength region (blue-sensitive emulsion) to produce bluish images as a whole, thus, images having a good color tone cannot be obtained.

(2) It is most effective for preventing fog for the support to be dyed with a dye mixture having main absorption peaks in the three wavelength regions of about 420 to about 460 nm, about 530 to about 570 nm and about 640 to about 680 nm.

(3) The yellow dye of the formula (I) is effective for preventing halation as well as light piping and enables dope-dying of polyesters, and, further, does not adversely affect the photographic properties.

While the invention has been described in detail and with reference to specific embodiments thereof, it will be apparent to one skilled in the art that various changes and modifications can be made therein without departing from the spirit and scope thereof.

What is claimed is:

1. A photographic polyester film support providing reduced halation and light-piping dyed with (a) a dye having a main absorption peak in the wavelength range of about 530 to about 570 nm, (b) a dye having a main absorption peak in the wavelength range of about 640 to about 680 nm, and (c) a dye having a main absorption peak in the wavelength range of about 420 to about 460 nm and represented by the formula (I):

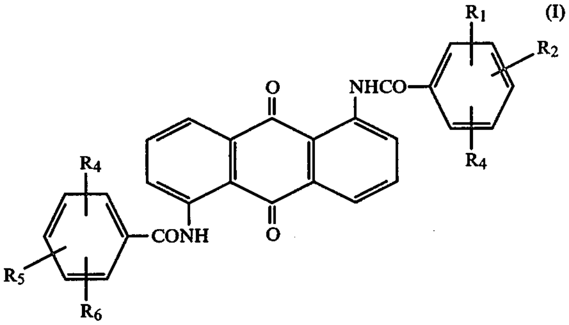

(I)

wherein $R_1$, $R_2$, $R_3$, $R_4$, $R_5$ and $R_6$, which may be the same or different, each represents —H, —OH, —$NH_2$, —$NHR_7$, —$NR_7R_8$, —Cl, —Br, an alkyl group having 4 or less carbon atoms or an alkoxy group having 4 or less carbon atoms; and $R_7$ and $R_8$, which may be the same or different, each represents an alkyl group having 4 or less carbon atoms or an aryl group.

2. The support as claimed in claim 1, wherein dye (c) has a main absorption peak in the wavelength range of 430 to 450 nm, dye (b) has a main absorption peak in the wavelength range of 540 to 560 nm and dye (a) has a main absorption peak in the wavelength range of 650 to 670 nm.

3. The support as claimed in claim 1, wherein the optical density of the spectral absorption in the wavelength range of 400 to 700 nm is 0.15 or less.

4. The support as claimed in claim 3, wherein said optical density of the spectral absorption ranges from 0.01 to 0.08.

5. The support as claimed in claim 1, wherein said dye (c) represented by the formula (I) is a dye represented by the formula (II):

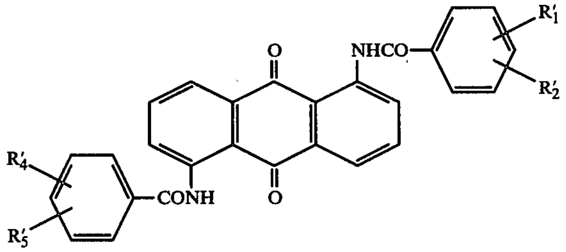

(II)

wherein $R'_1$, $R'_2$, $R'_4$ and $R'_5$, which may be the same or different, each represents —H, —OH, —$CH_3$, —$C_2H_5$, —$CH(CH_3)_2$, —$C(CH_3)_3$, —$OC_2H_5$, —$OCH(CH_3)_2$ or —$OC(CH_3)_3$.

6. The support as claimed in claim 1, wherein said dye (c) is 1,5-bis(p-methylbenzamido)anthraquinone, 1,5-bis(o-methylbenzamido)anthraquinone, 1,5-bis(o-methoxybenzamido)anthraquinone, 1-(p-methoxybenzamido)-5-(p-ethoxybenzamido)anthraquinone, or 1-benzamido-5-(2',4'-diethylbenzamido)anthraquinone.

7. The support as claimed in claim 1, wherein said dye (c) is 1,5-bis(benzamido)anthraquinone.

8. The support as claimed in claim 1, wherein said dye (a) is a dye represented by the formula (III):

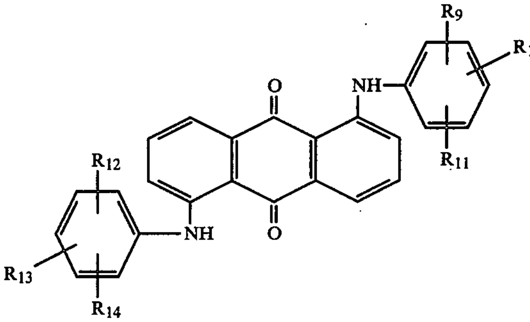

(III)

wherein $R_9$, $R_{10}$, $R_{11}$, $R_{12}$, $R_{13}$ and $R_{14}$, which may be the same or different, each represents —H, —OH, —$NH_2$, —$NHR_{15}$, —$NR_{15}R_{16}$, —Cl, —Br, an alkyl group having 4 or less carbon atoms or an alkoxy group having 4 or less carbon atoms; and $R_{15}$ and $R_{16}$ each has the same meaning as $R_7$ and $R_8$ in the general formula (I).

9. The support as claimed in claim 1, wherein said dye (b) is a dye represented by the formula (IV):

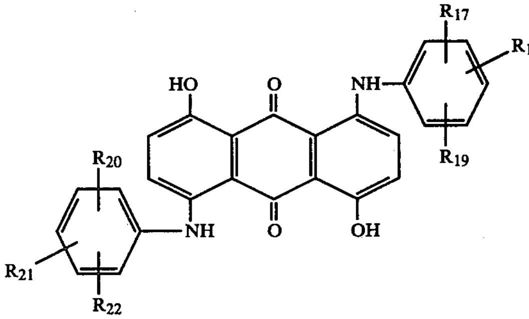

(IV)

wherein $R_{17}$, $R_{18}$, $R_{19}$, $R_{20}$, $R_{21}$ and $R_{22}$, which may be the same or different, each represents —H, —OH, —$NH_2$, —$NHR_{23}$, —$NR_{23}R_{24}$, —Cl, —Br, an alkyl group having 4 or less carbon atoms or an alkoxy group having 4 or less carbon atoms; and $R_{23}$ and $R_{24}$ each has the same meaning as $R_7$ and $R_8$ in the general formula (I).

10. The support as claimed in claim 1, wherein the optical density of the main absorption peaks in each of the wavelength ranges of about 420 to about 460 nm, about 530 to about 570 nm and about 640 to about 680 nm ranges from 0.01 to 0.15.

11. The support as claimed in claim 1, wherein the polyester is polyethylene terephthalate.

12. The support as claimed in claim 1, wherein in dye (c) the alkyl group for $R^1$ to $R^6$ is selected from the group consisting of methyl, ethyl, propyl, isopropyl, butyl and t-butyl.

13. The support as claimed in claim 8, wherein said dye (b) is a dye represented by the formula (IV):

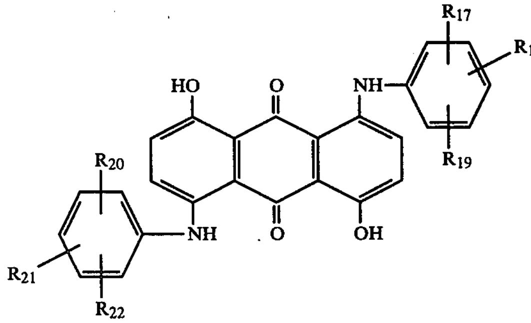

(IV)

wherein $R_{17}$, $R_{18}$, $R_{19}$, $R_{20}$, $R_{21}$ and $R_{22}$, which may be the same or different each represents —H, —OH, —$NH_2$, $NHR_{23}$, —$NR_{23}R_{24}$, —Cl, —Br, an alkyl group having 4 or less carbon atoms or an alkoxy group having 4 or less carbon atoms; and $R_{23}$ and $R_{24}$ each has the same meaning as $R_7$ and $R_8$ in the general formula (I).

* * * * *